(12) United States Patent
Liu et al.

(10) Patent No.: US 7,702,460 B2
(45) Date of Patent: Apr. 20, 2010

(54) ESTIMATE OF RELATIVE POSITION BETWEEN NAVIGATION UNITS

(75) Inventors: Gang Kevin Liu, Simi Valley, CA (US); Robert John Buchler, Calabasas, CA (US); Charles P. Bruner, Calabasas, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 201 days.

(21) Appl. No.: 11/810,305

(22) Filed: Jun. 5, 2007

(65) Prior Publication Data

US 2008/0114544 A1 May 15, 2008

(51) Int. Cl.
*G01C 21/00* (2006.01)
(52) U.S. Cl. .................................. 701/214; 342/357.08
(58) Field of Classification Search .................... 701/16, 701/213, 214; 342/357.08
See application file for complete search history.

(56) References Cited

U.S. PATENT DOCUMENTS 4,814,994 A * 3/1989 Doane et al. ................. 701/300
5,757,317 A 5/1998 Buchler et al.
5,991,691 A * 11/1999 Johnson ....................... 701/214
2002/0120400 A1* 8/2002 Lin ............................. 701/214
2005/0114023 A1* 5/2005 Williamson et al. .......... 701/214

* cited by examiner

*Primary Examiner*—Mark Hellner
*Assistant Examiner*—Helal A Algahaim
(74) *Attorney, Agent, or Firm*—Carmen Patti Law Group, LLC

(57) ABSTRACT

A first navigation unit of an apparatus in one example comprises a hybrid global positioning system (GPS)/inertial navigation system (INS) component. The hybrid GPS/INS component provides first GPS information and first INS information for the first navigation unit. The first navigation unit is configured to receive second GPS information and second INS information from a second navigation unit. The second navigation unit comprises a GPS component configured to determine a double-differenced GPS carrier phase measurement through employment of the first GPS information and the second GPS information. The first navigation unit comprises a relative Kalman filter configured to update an INS error estimate for an estimate of a relative position between the first and second navigation units based on the double-differenced GPS carrier phase measurement and the first and second INS information.

19 Claims, 2 Drawing Sheets

ESTIMATE OF RELATIVE POSITION BETWEEN NAVIGATION UNITS

TECHNICAL FIELD

The invention relates generally to navigation and more particularly to relative navigation

BACKGROUND

Precision relative navigation is known to be a key enabling capability for unmanned aerial vehicles (UAVs) and automatic landing applications, for example, the Autonomous Aerial Refueling (AAR) system and Joint Precision Approach and Landing System (JPALS). The important problem to be solved is automatic, reliable, accurate relative positioning of two moving vehicles.

SUMMARY

The invention in one implementation encompasses an apparatus. The apparatus comprises a first navigation unit that comprises a hybrid global positioning system (GPS)/inertial navigation system (INS) component. The hybrid GPS/INS component provides first GPS information and first INS information for the first navigation unit. The first navigation unit is configured to receive second GPS information and second INS information from a second navigation unit. The second navigation unit comprises a GPS component configured to determine a double-differenced GPS carrier phase measurement through employment of the first GPS information and the second GPS information. The first navigation unit comprises a relative Kalman filter configured to update an INS error estimate for an estimate of a relative position between the first and second navigation units based on the double-differenced GPS carrier phase measurement and the first and second INS information.

Another implementation of the invention encompasses a method. First global positioning system (GPS) information and first inertial navigation system (INS) information are received for a first vehicle. Second GPS information and second INS information are received for a second vehicle. A double-differenced carrier phase measurement is determined based on the first and second GPS information. A relative velocity between the first vehicle and the second vehicle is estimated based on the first and second INS information. A relative position between the first vehicle and the second vehicle is estimated based on the relative velocity. An INS error estimate for the relative position is updated based on the double-differenced carrier phase measurement and the relative position.

A further implementation of the invention encompasses a computer readable storage medium on which is embedded at least one computer program. The at least one computer program comprises a set of instructions for: receiving first global positioning system (GPS) information and first inertial navigation system (INS) information for a first vehicle; receiving second GPS information and second INS information for a second vehicle; determining a double-differenced carrier phase measurement based on the first and second GPS information; estimating a relative velocity between the first vehicle and the second vehicle based on the first and second INS information; estimating a relative position between the first vehicle and the second vehicle based on the relative velocity; and updating an INS error estimate for the relative position based on the double-differenced carrier phase measurement and the relative position.

DESCRIPTION OF THE DRAWINGS

Features of example implementations of the invention will become apparent from the description, the claims, and the accompanying drawings in which:

DETAILED DESCRIPTION

A precision relative navigation mechanization described herein that fuses global positioning system (GPS) and inertial measurement unit (MU) data from two moving vehicles has been developed. The relative accuracy requirements are achieved by applying double-differenced GPS carrier phase measurements. For example, taking advantage of the common error rejection from two different GPS systems and the high quality GPS carrier phase measurement. A geometry free carrier phase smoothing algorithm was also developed to mitigate the multipath error to further improve the GPS carrier phase measurement quality. Each hybrid GPS Inertial Navigation System (GPS/INS) solution incorporates GPS update measurements to calibrate the INS. The hybrid GPS/INS solution will also provide a better estimated GPS carrier phase integer ambiguity covariance matrix to be use by the Lambda algorithm (Least squares Ambiguity Decorrelation Adjustment) to improve the integer resolution performance. A compact relative Kalman filter uses integer-resolved double-difference GPS carrier phase measurements to update the error estimate of relative vehicle position derived from the INS messages. An integrity monitoring system will screen redundant sensor measurements to isolate and reject faulty measurements that would otherwise corrupt the relative navigation solution.

A real-time relative navigation (RelNav) capability is provided between a tanker and receiver by combining double-differenced carrier phase Global Positioning System (GPS) data with tanker and receiver inertial data to supply an accurate, robust relative navigation solution. The architecture can be rapidly hosted as a real-time system in a processor with interfaces consistent with existing interface control documents (ICDs) from Naval Air Systems Command (NAVAIR; Patuxent River, Md.) for RelNav flight tests. This system provides a RelNav capability that can be used for laboratory and flight testing, and the software will be architected to facilitate rapid re-hosting in an integrated navigation system, such as the LN-251 from Northrop Grumman (Woodland Hills, Calif.). The RelNav mechanization in one example is converted to a real-time system.

Figure 1:
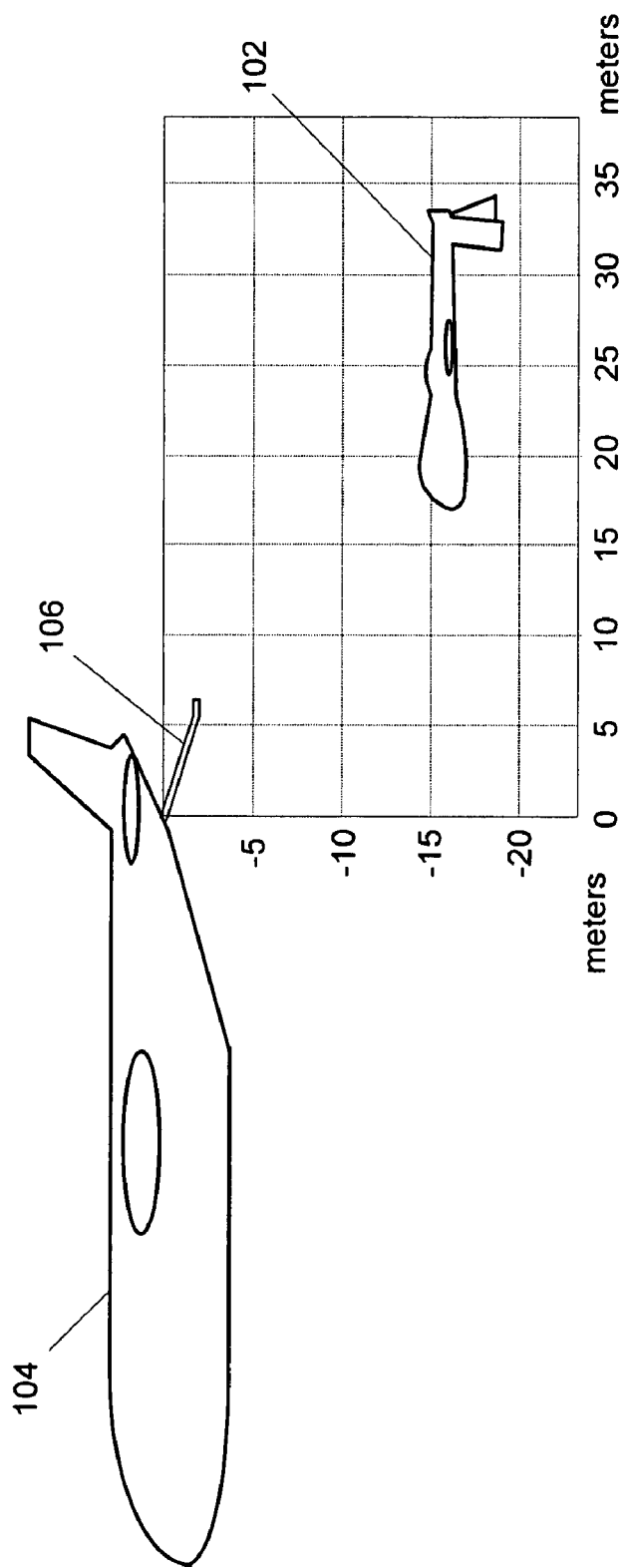
FIG. 1 is a representation of one implementation of an apparatus that comprises an unmanned aerial vehicle (UAV) and a tanker.

Turning to FIG. 1, an apparatus 100 in one example comprises an unmanned aerial vehicle (UAV) 102 and a tanker 104. Precision relative navigation is known to be an important enabling capability for UAVs. For example, an Autonomous Aerial Refueling (AAR) system is being developed by the Air Force Research Laboratory (AFRL), Wright Patterson Air Force Base, Ohio, for the purpose of demonstrating refueling concepts for the Joint Unmanned Combat Air System (J-UCAS). The important problem to be solved is automatic and accurate positioning of the J-UCAS (i.e., UAV 102) relative to the tanker 104 to enable rapid, accurate connection of the refueling boom 106, as shown in FIG. 1. Other capabilities such as autonomous carrier landing also depend on a precise, reliable relative navigation solution.

Representative requirements for RelNav performance include: maintaining relative position accuracy of 25 cm ($1\sigma$) for up to 60 seconds without a GPS update; maintaining integrity levels of $10^{-9}$ per operation with containment limits of (10 m×10 m×8 m) for up to 10 minutes exposure; probability of loss of function (i.e., discontinuity) less than $10^{-5}$ per hour; and the probability of loss of function for $T_{max}$ (=15 min) (i.e., unavailability) less than $10^{-3}$.

An additional constraint imposed on realistic RelNav architectures is the bandwidth limitations on data that can be passed between vehicles. NAVAIR has defined datalink requirements for its RelNav developments that have realistic bandwidth allocations and that provide GPS and inertial data to the UAV. The technical challenge addressed in this proposal is to meet the accuracy, integrity, continuity, and availability of the relative navigation solution in various GPS signal blockage/interference environments within bandwidth and other system constraints.

Figure 2:
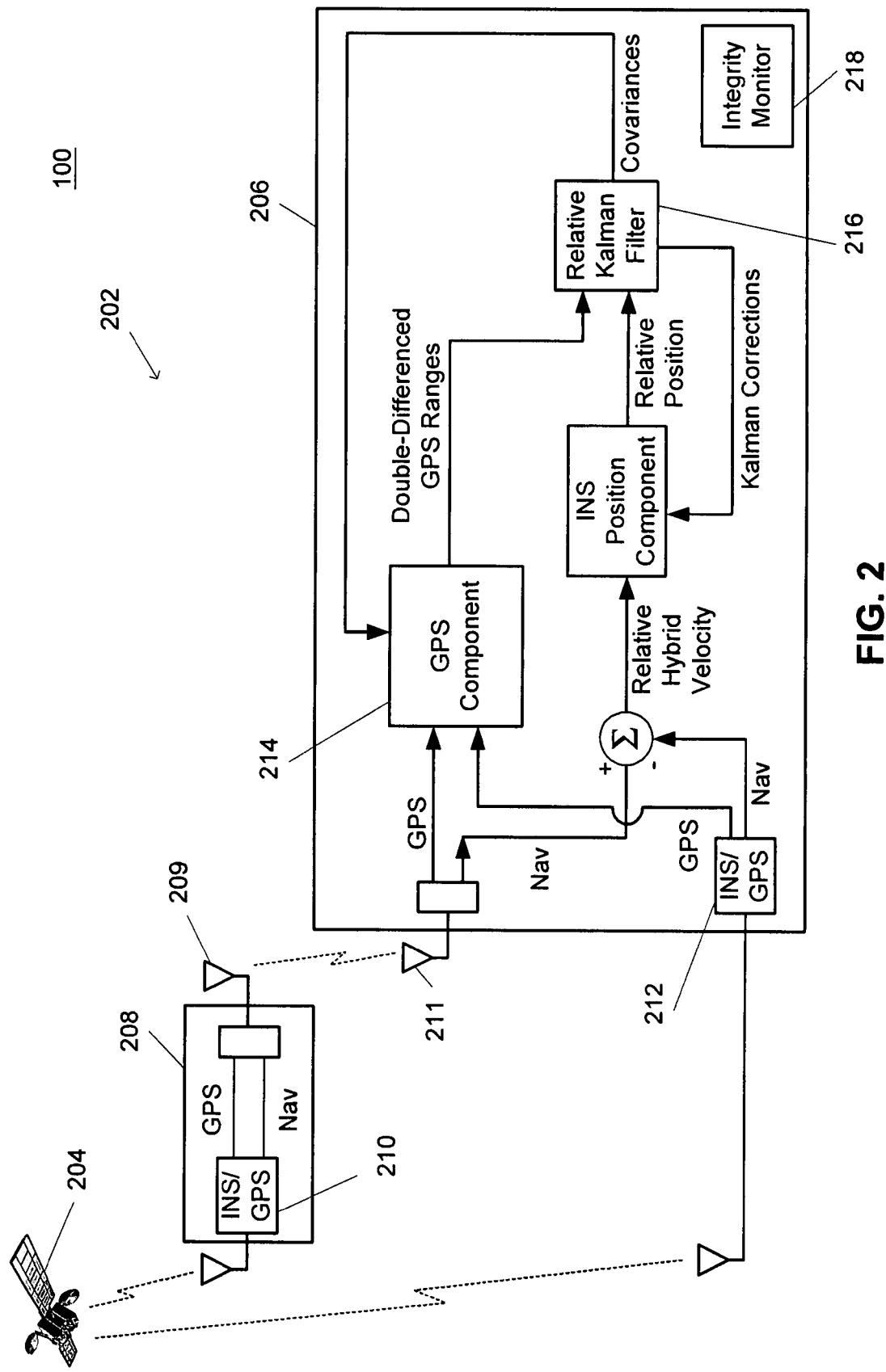
FIG. 2 is a representation of one implementation of a precision relative navigation system and GPS satellite of the apparatus of FIG. 1.

Precision relative navigation is important to many unmanned vehicle operations. Turning to FIG. 2, the apparatus 100 in one example comprises a precision relative navigation system 202 and GPS satellite 204. The precision relative navigation system 202 fuses GPS and inertial data from two navigation units, for example, a navigation unit 206 and navigation unit 208. The navigation units 206 and 208 in one example are mounted within the tanker 104 and UAV 102, respectively. The navigation units 206 and 208 in one example communicate through a tactical targeting network technology (TTNT) protocol via antennas 209 and 211. A GPS component 214 applies double-differenced GPS carrier phase measurements, taking advantage of the common error rejection from two different GPS systems and the high quality GPS carrier phase measurement. Each hybrid GPS Inertial Navigation System (INS) component 210 and 212 incorporates GPS update measurements to calibrate the INS. The GPS component 214 resolves GPS carrier phase integer ambiguities using the Lambda algorithm. A compact relative Kalman filter 216 uses integer-resolved double-difference GPS measurements to update the error estimate of relative vehicle position derived from the INS messages. An integrity monitoring system 218 screens redundant sensor measurements to isolate and reject faulty measurements that would otherwise corrupt the relative navigation solution.

The proposed RelNav architecture is consistent with the tactical targeting network technology interface control document (TTNT ICD) and can be implemented in an external processor. A challenge to using the double-differenced carrier phase measurement is resolving its integer ambiguity, which is the inherent unknown integer constant (in cycles) associated with the carrier phase measurement itself. The Lambda algorithm is adopted for this purpose. The Lambda algorithm resolves the correct integer solution under unfavorable satellite geometries. Developing a more reliable validation procedure is just as important as resolving the integer itself. Other closely related issues are how to detect cycle slip, how to recover the integer after communications link interruptions, and how to maintain validated Lambda solutions. These issues cannot be completely resolved by the Lambda algorithm, but can be addressed by using the IMU as a complementary measurement reference. Specifically, covariances fed back from the relative Kalman filter 216 into the Lambda algorithm mechanization of the GPS component 214 are used to detect cycle slips and assist integer solution recovery in the event of intermittencies in communication.

The Kalman Filter 216 integrates double-differenced carrier phase GPS data and inertial data from both vehicles. Since the hybrid velocity outputs from both GPS/INS systems are well estimated and maintained (unlike the absolute position data), they are valid inputs to propagate relative position. A standalone relative navigation Kalman filter 216 is implemented to estimate the relative position and velocity errors using the integer resolved double-differenced carrier phase measurements for update. The double-differenced float integer solutions are maintained as part of the error states and are also used to track their correlations with the relative navigation states. This approach provides optimum covariance input to Lambda and measures for cycle slip detection, facilitates integer solution recovery upon communications link interruption, and improves the validation of new Lambda solutions. This mechanization uses a minimum of three relative position states, three relative velocity states, an up to m−1 float integers, where m is the number of GPS satellites in view of both receivers.

One advantage of this mechanization is its modularity with respect to the standard navigation Kalman filter already implemented by the GPS/INS. Because it requires only access to the navigation message from the INS, it can be hosted on any target platform or existing application. It can also be implemented as an add-on to the existing navigation solution hybrid Kalman filter. This will greatly facilitate system integration and testing.

For scenarios requiring the precision obtained by using double difference carrier phase ambiguity resolution (autoland, autonomous air refueling) the integrity of the estimated cycles is important. Integrity is enhanced by using all available data in a near optimal approach, as constrained by scenario, data link speed, etc.

The relative nav solution uses L1, L2 double differenced carrier-smoothed code as pseudo-range observables, L1, L2 double differenced carrier as phase observables, and is propagated between updates by the difference in hybrid velocity from the two GPS/INS autonomous systems 210 and 212. The relative solution uses a Kalman Filter (in lieu of the less optimal LS solution) to estimate floated double difference integers and relative position, velocity, and acceleration states. Incorporating the autonomous hybrid solution velocities provides a much tighter model for state propagation than GPS only (which would require dynamic states with large Q).

The ability to detect GPS anomalies (code or carrier) is enhanced by the IMU data since it supplies an accurate short term measure of position change. The ability to correct identifiable anomalies that can be recovered (e.g. cycle slip) is also enhanced, providing continuity of the measurements passed to the Relative-Kalman Filter.

Integers are resolved using the LAMBDA approach, where, given the integer float solution and covariance matrix from the Relative Nav Kalman, provides a transformed, largely uncorrelated, set of integer vector candidates. Several approaches to selection can be used. In the first approach, an appropriately sized space is searched and the best and next best solution obtained, with a decision to declare valid pending chi2 testing of both solutions. In a second approach (bootstrapping) a solution is declared when the decision requires only rounding (no search) of the floated integers. The rounding may only apply to some of the integers, leaving some floated. In any case, if some integers are declared resolved, an ("outside the Kalman") adjustment is made to the relnav solution to account for the improvement provided by the declared integer(s) and this adjusted value is provided for the user rel-nav value. Since the relnav Kalman is not changed by integer declaration, it is available without degradation (or re-initialization) in the likely event of additional 1-sec epoch data subsequently available. The integers can again be resolved using the latest data. Comparison of current and prior integers provides additional information.

For solutions not requiring accuracy afforded by integers, the integer portion of the solution could be dropped. This does not affect anything else, because, even with integers, the relative Kalman is not changed when integers are declared. In fact, integers could still be computed in this less accurate application, and used as an additional integrity monitor.

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more implementations of the invention. For example, the navigation units 206 and 208 may comprise computer-readable signal-bearing medium. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a first navigation unit provided in a first moving vehicle that comprises a hybrid global positioning system (GPS)/inertial navigation system (INS) component, wherein the hybrid GPS/INS component provides first GPS information and first INS information for the first navigation unit;
wherein the first navigation unit is configured to receive second GPS information and second INS information from a second navigation unit provided in a second moving vehicle;
wherein the second navigation unit comprises a GPS component configured to determine a double-differenced GPS carrier phase measurement through employment of the first GPS information and the second GPS information;
wherein the first navigation unit comprises a relative Kalman filter configured to update an INS error estimate for an estimate of a relative position between the first and second navigation units based on a combination of the double-differenced GPS carrier phase measurement and the first and second INS information, wherein each GPS/INS hybrid positioning solution incorporates OPS update measurements to calculate the INS error estimate; wherein the relative Kalman filter is configured to feed back Kalman corrections to update an INS error estimate for the relative position estimate; wherein the relative Kalman filter is configured to feed back covariances to the GPS component for at least one of detection of cycle slips and recovery of an integer solution.

2. The apparatus of claim 1, wherein the GPS component employs a Lambda algorithm to determine an integer solution for GPS carrier phase integer ambiguities for the double-differenced GPS carrier phase measurement.

3. The apparatus of claim 2, wherein the OPS component employs the covariances fed back from the relative Kalman filter for at least one of detection of cycle slips and recovery of the integer solution.

4. The apparatus of claim 3, wherein the second navigation unit comprises an INS position component configured to determine the estimate of the relative position based on the first and second INS information.

5. The apparatus of claim 4, wherein the INS position component integrates a relative hybrid velocity of the first and second navigation units and employs the INS error estimate to determine the estimate of the relative position.

6. The apparatus of claim 5, wherein the relative hybrid velocity comprises a difference between a velocity of the first navigation component and a velocity of the second navigation component;
wherein the first INS information comprises the velocity of the first navigation component, wherein the second INS information comprises the velocity of the second navigation component.

7. The apparatus of claim 6, wherein the first navigation unit comprises an integrity monitor configured to screen a plurality of redundant sensor measurements to isolate and reject faulty measurements associated with the first GPS information and the first INS information.

8. The apparatus of claim 1, wherein the hybrid GPS/INS component comprises a standalone hybrid GPS/INS component.

9. The apparatus of claim 1, wherein the first vehicle comprises a refueling tanker aircraft or aircraft carrier;
wherein the second vehicle comprises an unmanned aerial vehicle (UAV);
wherein the first navigation unit allows autonomous refueling or landing of the UAV.

10. A method, comprising the steps of:
receiving first global positioning system (GPS) information and first inertial navigation system (INS) information for a first vehicle;
receiving second OPS information and second INS information for a second vehicle;
determining a double-differenced carrier phase measurement based on the first and second GPS information;
estimating a relative velocity between the first vehicle and the second vehicle based on the first and second INS information;
estimating a relative position between the first vehicle and the second vehicle based on the relative velocity; and
updating an INS error estimate for the relative position via a hybrid GPS/INS system based on the double-differenced carrier phase measurement and the relative position of at least one of the first vehicle and the second vehicle; feeding back an INS error estimate for the relative position based on Kalman corrections from the relative Kalman filter; feeding back covariances from the relative Kalman filter to the GPS component for at least one of detection of cycle slips and recovery of an integer solution.

11. The method of claim 10, wherein the step of receiving the second GPS information and second INS information for the second vehicle comprises the step of:

receiving the second GPS information and the second INS information from the second vehicle through a tactical targeting network technology (TTNT) protocol antenna.

12. The method of claim 10, wherein the step of estimating the relative position comprises the step of:

integrating the relative velocity between the first vehicle and the second vehicle.

13. The method of claim 10, wherein the step of updating the INS error estimate for the relative position comprises the step of:

processing the relative position and the double-differenced carrier phase measurement through a relative Kalman filter to generate an error estimate update and a covariance matrix.

14. The method of claim 13, wherein the step of determining the double-differenced carrier phase measurement based on the first and second OPS information comprises the step of:

determining an integer solution for GPS carrier phase integer ambiguities for the double-differenced carrier phase measurement through employment of a Lambda algorithm.

15. The method of claim 14, wherein the step of determining the integer solution comprises the step of:

employing the covariance matrix from the relative Kalman filter to determine the integer solution.

16. The method of claim 13, wherein the step of estimating the relative position comprises the step of:

estimating the relative position based on the relative velocity and the error estimate update from the relative Kalman filter.

17. A computer readable storage medium on which is embedded at least one computer program comprising a set of instructions for:

receiving first global positioning system (GPS) information and first inertial navigation system (INS) information for a first vehicle via a hybrid GPS/INS system;

receiving second GPS information and second INS information for a second vehicle via a hybrid GPS/INS system;

determining a double-differenced carrier phase measurement based on the first and second OPS information;

estimating a relative velocity between the first vehicle and the second vehicle based on the first and second INS information;

estimating a relative position between the first vehicle and the second vehicle based on the relative velocity; and updating an INS error estimate for the relative position based on the double-differenced carrier phase measurement and the relative position of at least one of the first vehicle and the second vehicle; feeding back an INS error estimate for the relative position based on Kalman corrections from the relative Kalman filter; feeding back covariances from the relative Kalman filter to the GPS component for at least one of detection of cycle slips and recovery of an integer solution.

18. The computer readable storage medium of claim 17, wherein the set of instructions for updating the INS error estimate for the relative position comprises a set of instructions for:

processing the relative position and the double-differenced carrier phase measurement through a relative Kalman filter to generate an error estimate update and a covariance matrix.

19. The computer readable storage medium of claim 18, wherein the set of instructions for determining the double-differenced carrier phase measurement based on the first and second GPS information comprises a set of instructions for:

determining an integer solution for GPS carrier phase integer ambiguities for the double-differenced carrier phase measurement through employment of a Lambda algorithm;

wherein the set of instructions for determining the integer solution comprises a set of instructions for:

employing the covariance matrix from the relative Kalman filter to determine the integer solution;

wherein the set of instructions for estimating the relative position comprises a set of instructions for;

estimating the relative position based on the relative velocity and the error estimate update from the relative Kalman filter.

* * * * *